Patented Dec. 25, 1928.

1,696,766

UNITED STATES PATENT OFFICE.

DONALD W. HOWE, OF BILOXI, MISSISSIPPI.

PEANUT BUTTER.

No Drawing.   Application filed December 6, 1927. Serial No. 238,237.

My invention relates to the preparation of peanut butter in which the tendency to stick to the mouth is controlled or entirely eliminated.

Peanut butter is ordinarily prepared from roasted peanuts reduced to a paste by grinding with any suitable grinder. The paste is produced by grinding the peanuts fine enough to break down the cell structure, thereby liberating the oil. The cell walls are composed chiefly of cellulose, protein and starch and these materials are reduced to the state of a powder. The latter mixed with the oil forms a paste. Due to its dryness, peanut butter in this form sticks or clogs to the mouth.

My invention has for its primary object the control or the elimination of the above referred-to tendency of the paste to stick or clog to the mouth, and this may be accomplished by incorporating powdered material in the peanut butter. My invention is based upon the property which finely divided material possesses of dissolving very rapidly in the saliva of the mouth. By very finely powdering the clogging reducing agent, its area is greatly increased and there is present an enormous surface for the saliva to act upon, greatly hastening the solution of the agent. As the clogging reducing agent is uniformly distributed throughout the peanut butter numerous avenues of attack for the saliva are presented, and in this connection it may be stated that the clogging reducing agent is more soluble in the saliva than the peanut butter itself. Therefore, it goes into solution first and in doing so effects a much more rapid emulsification or dispersion of the peanut butter in the saliva than has heretofore been possible, whereby the clogging property of the peanut butter is reduced and it becomes more palatable and desirable.

It has long been known that peanut butter has a tendency to clog or stick to the roof of the mouth. When I first experimentally attacked the problem of producing a peanut butter which did not possess this disadvantage, I initially tried sugar in its ordinary granulated form. This, I ascertained, did not successfully solve the problem. After numerous experiments I discovered that if the sugar is finely ground that the tendency to clog is materially reduced or entirely eliminated. Sugar, of course, is soluble in the saliva of the mouth but in its ordinary granulated state, does not go into solution rapidly enough to effect the desired result. It is only when it is finely ground that its area is enormously increased and as a direct result thereof, it quickly goes into solution in the saliva. It is clear that whether a substance will act as a clogging reducing agent depends on its property of rapidly going into solution in the saliva of the mouth or, stated differently, on its solubility. Therefore, my invention resides broadly in incorporating in peanut butter a clogging reducing agent which rapidly goes into solution into the saliva. In the preferred and more specific form of my invention I contemplate the incorporation in peanut butter of a clogging reducing agent in very finely powdered form. The reduction of the clogging reducing agent to such a form may be accomplished by mechanical means or by crystallization from dilute solutions or by any means known in the prior art.

After having succeeded in reducing the clogging properties of peanut butter by the use of finely divided sugar, I continued my experiments and discovered that many soluble organic and inorganic compounds act as clogging reducing agents when they are in such a form as will rapidly go into solution in the saliva. Compounds in a granulated form, comparable to granulated sugar, have little effect on reducing clogging. It is only when they are in such a form as will enable them to go rapidly into solution in the saliva that they are effective, and this may be accomplished by finely grinding.

I shall hereafter refer in detail to the various compounds that may be used to reduce clogging. However, at this point I shall specifically illustrate my invention by the use of finely divided sugar.

Various sugars, such as sucrose, dextrose, maltose, levulose and lactose or mixtures of the same, may be added to the peanut butter to reduce this tendency to stick to the mouth. Further, syrups such as cane syrup, malt syrup, sorghum syrup, corn syrup, and maple syrup may be used. Syrups of this character are dried and powdered before they are incorporated in the peanut butter. I prefer to use dextrose as this particular sugar dissolves very rapidly in the saliva, has a low sweetening power and is readily obtained in the pure form. As it is not desired to produce a confection, dextrose is particularly suitable on account of the above referred-to low sweetening power. The amount of sugar to be added to the peanut butter will depend upon the physical and chemical characteristics of the peanuts, sugar and the degree of fineness of the sugar and to what degree it is desirable to control or eliminate the tendency of the peanut butter to stick to the mouth.

In my experiments, I have used varying percentages of sugar but find that the most satisfactory results are obtained by adding between 5% and 30% of sugar to the peanut butter, the finished product containing between 95% and 65% of peanut butter. Satisfactory results have been obtained by using 10% of powdered sugar, this amount reducing the tendency to clog, to a very great extent. Peanut butter containing 20% of powdered sugar has been found to give very satisfactory results. As indicated, the percentage of sugar to be added will vary, according to the physical and chemical properties of the peanut butter and the sugar. While I do not desire to be limited to the addition of any specific percentage of sugar, usually it will not be found necessary to add over 30% of powdered sugar.

The degree to which the sugar is powdered may, of course, vary but good results have been obtained using powdered sugar commercially known as XXXX. Better results are obtained when using XXXXXX sugar. It is not desired to be limited to the addition of any specific degree of fineness other than to state that granulated sugar, as ordinarily commercially produced, is not satisfactory and must be ground or pulverized before it is used. In general, it may be stated that commercially prepared powdered sugars are satisfactory for incorporation in the peanut butter.

The final product comprising peanut butter having incorporated therein finely powdered sugar possesses the appearance of ordinary peanut butter and is still in its paste form.

In the manufacture of my new product, any suitable type of grinder may be used, for example, the Lambert or Burns machine. These machines are equipped with an automatic salt feeder, which feeds salt to the peanuts, as they are ground. Advantage may be taken of this construction to mix the powdered sugar with the salt and feed this mixture into the peanuts as they are ground. However, it is not necessary to mix the powdered sugar with the peanut butter, as above described. The powdered sugar may be mixed with the peanut butter by any suitable mixer or kneader, it only being essential that powdered sugar be uniformly mixed throughout the peanut butter.

In general, it may be stated that the finer the peanut butter is ground, the greater must be the amount of powdered sugar added to produce the same results. I have also found that the heavier the roast, the greater the amount of powdered sugar necessary to produce the same results. The finely powdered sugar may be in the form of fondant, which is specially prepared finely grained sugar. Fondant may be prepared by any of the various methods well known to those skilled in the art.

In the claims the expression "a powdered sugar" is intended to include any powdered sugar, such as sucrose, dextrose, maltose, levulose, lactose and their equivalents, which will reduce the tendency of peanut butter to stick to the mouth. This expression is also intended to include mixtures of sugars, which will function to reduce the tendency of the peanut butter to stick to the mouth.

The above example is illustrative of one form of my invention in which a peanut butter is produced having incorporated therein finely divided sugar as a clogging reducing agent. A number of other agents may advantageously be used to reduce clogging.

I have discovered that various fruit and vegetable juices after they are dried and finely powdered are effective in reducing the clogging property of peanut butter. For example, orange juice, pear juice, grape juice, apple juice, beet juice, and cane juice work very well.

Dextrins such as amylo-dextrin, erythro dextrin and achroo-dextrin may be used. As the starch molecule is broken down, the above-mentioned starches are formed, achroo-dextrin being the last dextrin before inversion to sugars. Proteins such as gelatine, albumen and their related compounds may be finely ground and used.

The following salts in finely divided form have been used for reducing the clogging properties of peanut butter, sodium, potassium and ammonium salts of acids such as the chlorides, sulfates, tartrates, citrates, lactates, acetates, malates, and oxalates. Magnesium salts for example, magnesium sulfate, chloride or acetate, are suitable. Various other salts, not specifically mentioned, may be used. Some of these salts, all of which are crystalline under ordinary conditions, are more effective than others. As previously mentioned, the ability to reduce clogging is a function of their solubility. The greater the solubility, the greater the capacity to reduce clogging. For example, sodium acetate is ordinarily very soluble and, in its finely divided form, where it presents a large area or surface whereby it can quickly go into solution in the saliva, it has a high capacity for reducing clogging. On the other hand, sodium oxalate is only slightly soluble and therefore, it has a minimum effect in reducing the clogging properties.

In the example showing the use of sugar, I have set forth the use of certain percentages. In general, it may be stated that the quantity of the clogging reducing agent it is necessary to use is a function of and depends upon its solubility. The greater the solubility of the agent, the less there is required. With a very soluble salt, such as sodium acetate, a distinct reduction in the clogging properties of the peanut butter is noticed when between 3% and 5% is used. However, in the case of a slightly soluble salt, such as sodium oxalate, it may require as much as 10% or more to produce a noticeable improvement in the peanut butter. In general, the slightly soluble salts do not decrease the clogging properties of the peanut butter so effectively as the very soluble salts. With very soluble salts satisfactory results are attained by using a quantity less than 30%. By "satisfactory" it is meant practical elimination of clogging. However, I desire to point out that in some cases it is not desired to completely eliminate the clogging.

Some of the agents mentioned above in addition to reducing the clogging properties of the peanut butter, also perform other functions. For example, magnesium sulfate, when present in the peanut butter confers laxative properties upon the composition. As far as I am aware, I am the first to produce a peanut butter which is pleasing to take internally and additionally possessing a laxative property.

Further, when fruit juices in the powdered state are incorporated in the peanut butter, they improve the medicinal value of the peanut butter as the composition has a high vitamine content.

My invention is not limited to the addition of only one clogging reducing agent. The latter may consist of a plurality of substances. For example, an organic agent may be combined with an inorganic agent. Sodium acetate may be combined with powdered fruit juices such as orange juice, grape juice, and pear juice. Two organic agents used as powdered sugar and powdered fruit juices may be incorporated in the peanut butter or two inorganic agents may be added.

In general, the quantity of clogging reducing agent which it is necessary to add to the peanut butter will vary. In the case of very soluble compounds, such as sodium acetate, sodium lactate, dextrose and other soluble salts, a distinct improvement is noticed when 3 to 5% is added. A very material improvement occurs with the addition of 8 to 12% and practical elimination is effected with 15 to 25%. These figures are merely illustrative and are not to be taken as limitations upon the percentages of the clogging reducing agent which is added to the peanut butter.

My experiments indicate that the percentage of clogging reducing agent which is added to the peanut butter will vary according to whether the peanuts have been given a light roast or heavy roast. Further, the fineness to which the peanuts are ground will have some influence upon the amount of clogging reducing agent which it is necessary to add. Different kinds of peanuts and different grades of peanuts also have minor influence on the percentage of clogging reducing agent which it is necessary to have.

The present application is a continuation in part of applicant's application, Serial No. 131,314, filed August 24, 1926.

What I claim is:

1. Peanut butter having substantially uniformly distributed therein a soluble clogging reducing agent in finely powdered form presenting a large area whereby it is adapted to be rapidly dissolved by the saliva.

2. Peanut butter having substantially uniformly distributed therein an organic clogging reducing agent in finely powdered form presenting a large area whereby it is adapted to be rapidly dissolved by the saliva.

3. A peanut butter having substantially uniformly distributed therein a powdered sugar to reduce the clogging properties of the peanut butter.

4. Peanut butter having substantially uniformly distributed therein powdered dextrose to reduce the clogging properties of the peanut butter.

5. Peanut butter having substantially uniformly distributed therein 5% to 30% of powdered dextrose to reduce the clogging properties of the peanut butter.

6. The process of producing a food product comprising grinding peanuts and substantially uniformly distributing therein during the grinding, a mixture of salt and a powdered sugar whereby the tendency of the peanut butter to stick to the mouth is reduced.

7. The process of producing a food product comprising grinding peanuts and substantially uniformly distributing therein salt and a powdered sugar whereby the tendency of the peanut butter to stick to the mouth is reduced.

In testimony whereof I hereunto affix my signature.

DONALD W. HOWE.